United States Patent [19]
Caletti

[11] 3,938,192
[45] Feb. 10, 1976

[54] METHOD OF MANUFACTURING A SPINDLE ASSEMBLY FOR A DISC DRIVE

[75] Inventor: Robert H. Caletti, Menlo Park, Calif.

[73] Assignee: Information Storage Systems, Inc., Cupertino, Calif.

[22] Filed: May 27, 1975

[21] Appl. No.: 580,762

Related U.S. Application Data

[63] Continuation of Ser. No. 441,172, Feb. 11, 1974, abandoned.

[52] U.S. Cl. ............... 360/133; 206/444; 346/137; 360/97
[51] Int. Cl.² .................. G11B 25/04; G11B 17/26; G11B 19/20
[58] Field of Search ............ 360/133, 97–99, 360/86, 135; 206/444, 310, 327; 274/39 A; 346/137; 29/DIG. 68, DIG. 49

[56] References Cited
UNITED STATES PATENTS

| | | |
|---|---|---|
| 3,176,281 | 3/1965 | Pattison ........................ 360/133 |
| 3,196,422 | 7/1965 | Cheney ........................ 360/133 |
| 3,465,875 | 9/1969 | McKelvey .................... 360/133 |
| 3,643,240 | 2/1972 | Raiser ........................... 360/133 |
| 3,706,085 | 12/1972 | Mowrey ....................... 360/135 |
| 3,762,543 | 10/1973 | Wirth ............................ 360/133 |
| 3,786,454 | 1/1974 | Lissner .......................... 346/137 |
| 3,817,088 | 6/1974 | Herbig .......................... 360/133 |
| 3,825,951 | 7/1974 | Katsumori .................... 360/133 |

*Primary Examiner*—Alfred H. Eddleman
*Attorney, Agent, or Firm*—Gerald L. Moore

[57] ABSTRACT

This invention relates to a method of manufacturing a spindle assembly for a disc drive comprising a drive shaft with a centering hub and support plate which interfit in a manner to support and center a disc pack on the disc drive.

3 Claims, 2 Drawing Figures

METHOD OF MANUFACTURING A SPINDLE ASSEMBLY FOR A DISC DRIVE

This is a continuation of application Ser. No. 441,172, filed Feb. 11, 1974, now abandoned.

CROSS REFERENCE TO RELATED APPLICATIONS

This invention relates to a spindle such as that used in U.S. Pat. No. 3,768,083, *Baseplate Assembly for a Disc Drive*, Pejcha, issued on Oct. 23, 1973; and U.S. Application Ser. No. 432,009, filed Jan. 9, 1974 and entitled *Carriage Assembly for Magnetic Storage Drive*.

BACKGROUND OF THE INVENTION

Direct access storage devices of the type commonly referred to as disc drives employ a rotating disc or a plurality or stack of rotating discs as a storage media. In such devices, one or more discs are mounted for rotation about a fixed vertical axis in proximity to an access mechanism which carries an array of read/write heads on a supporting mechanism. The access mechanism usually includes a linear motor mounted on an extension which is radially positioned from the centerline of the recording discs to facilitate movement of the read/write heads radially of the disc surfaces.

The disc pack is rotated at a constant speed while the read/write heads are moved to discrete positions along a radius of the discs so data can be recorded and read back from data tracks forming concentric circles on the disc surface. In present day devices, these data tracks are very closely spaced, thereby requiring that the read/write heads be positioned with great accuracy for recording and retrieving the data.

The disc packs are removable and replaceable on a disc drive. The packs have centering and support surfaces which contact cooperating surfaces on a spindle of the disc drive. The spindle is power driven for rotation of the disc pack at a constant speed. Because the disc packs are removable and replaceable, the interfitting surfaces on the spindle and the disc pack must be located and machined with precision on each disc drive because the packs are also interchangeable between drives. In the past, such spindles have generally been formed as a single piece structure requiring the total spindle body to be hardened and machined. It is the purpose of this invention to provide an improved and more economical spindle assembly for use in disc drives.

SUMMARY OF THE INVENTION

A method of manufacturing a spindle assembly for a disc drive having a baseplate and utilizing a disc pack having centering surfaces and horizontal support surfaces spaced radially outward from the centering surfaces, a method of manufacturing a spindle assembly comprising the steps of providing a main shaft, fixing a hardened centering hub around one shaft end having exterior surfaces for contacting the pack centering ring and fixing a hardened support plate around the shaft adjacent the centering hub having a horizontal support surface spaced radially outwardly from the shaft for supporting the disc pack.

DESCRIPTION OF THE INVENTION

Figure 1:
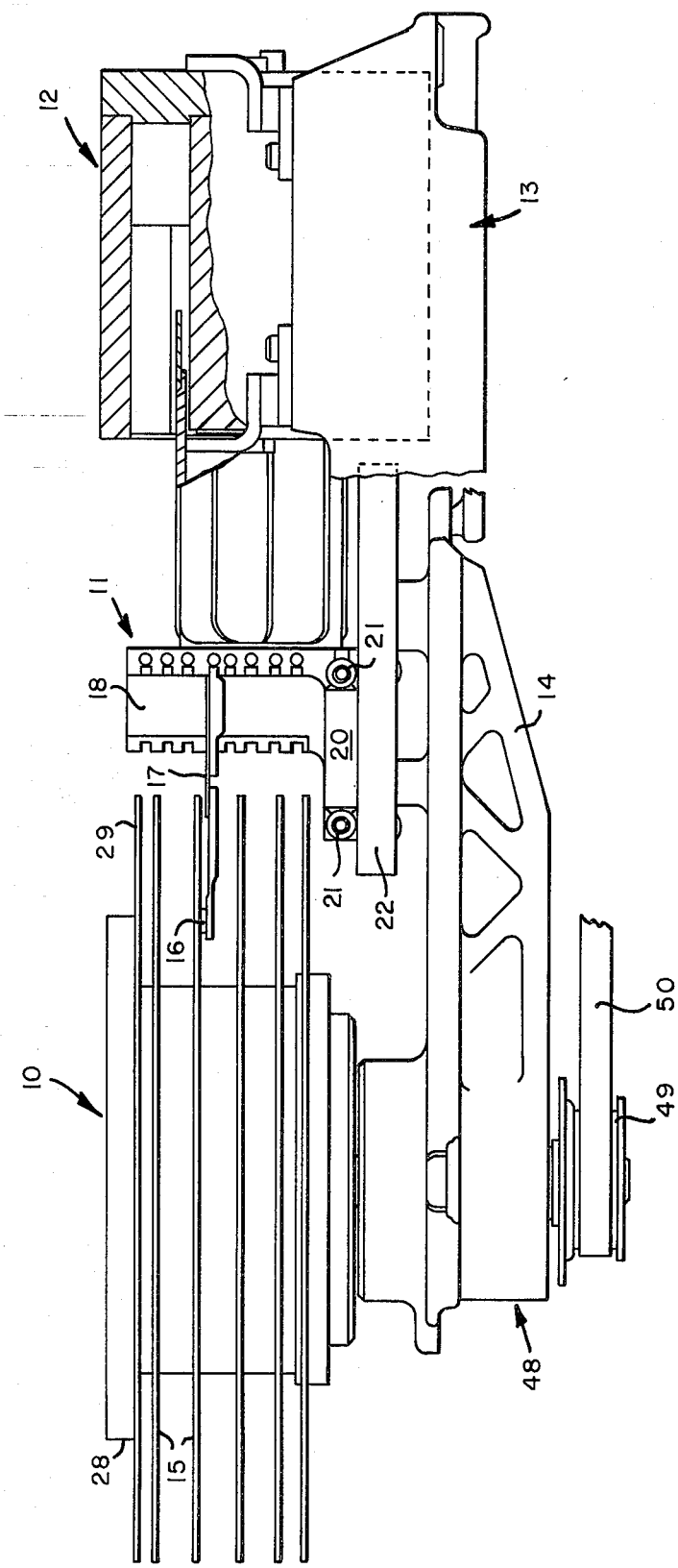
FIG. 1 is a side view, partially in cross-section, of a disc drive apparatus.

In FIG. 1 are shown the major components of the disc drive used to read and record data on a disc pack 10 and including a read/write head assembly 11 and a linear motor 12 mounted on a baseplate assembly 13 for the purpose of reading and writing information in digital form on magnetic surfaces (not shown) on the individual discs 15. The disc pack 10 comprises a plurality of the recording discs with each having on the upper and lower surfaces thereof the magnetic material on which data can be recorded magnetically.

For reading and writing information on disc pack surfaces, a read/write head 16 is supported in close proximity to each associated disc magnetic surface by an arm 17. In the drawing only one arm is shown for illustration purposes. The arms are held by a support assembly 18 comprising a carriage 20 provided with a plurality of rollers 21 for movement along a pair of parallel disposed rails 22 fixed to a spindle assembly 14. Linear movement of the support assembly shifts the heads in a direction radially across the disc surfaces. By proper energization of the read/write heads, information in digital form can be transferred to and from the disc surfaces. Since the disc pack is rotated, the information is recorded on concentric data tracks on each disc surface. A more complete explanation of such an apparatus can be obtained by referral to U.S. Pat. No. 3,578,075, issued on June 22, 1971, and having as inventors Stanley Brown, et al.

Figure 2:
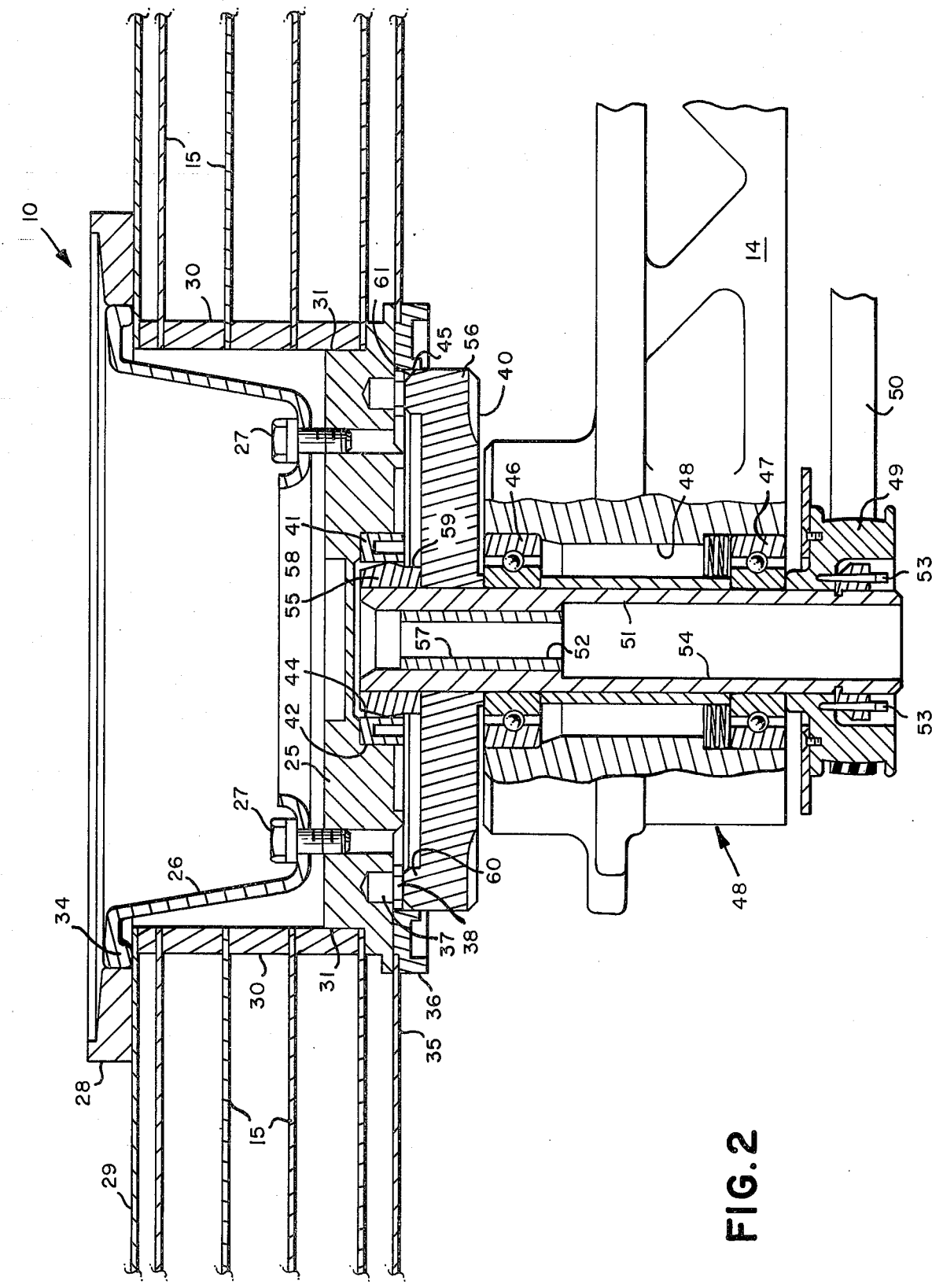
FIG. 2 is an enlarged view in cross-section of a disc pack and spindle assembly of the subject invention.

Referring now more particularly to FIG. 2, one example of a disc pack suitable for use with the disc drive heretofore described comprises a lower plate 25 to which is fixed an inner support member 26 by a plurality of bolts 27. A guard disc 29 is provided to shield the discs. The discs 15 are held between a plurality of cylindrical spacers 30 extending upward from a recess 31 in the lower plate 25. The discs are held in place by the upper lip 34 of the inner support member pressing against the spacers and clamping the discs between the spacers and against the lower plate. A lower guard disc 35 is also fixed to a centering ring 36 attached to the lower surface of the lower plate 25.

For supporting the disc pack, a plurality of vertically extending hardened inserts 37 are fixed into openings in the bottom of the lower plate with downwardly facing surfaces 38 which ride against a spindle flange 40 of the disc drive. Also an insert 41 is fixed into a central opening 42 of the lower plate having inwardly facing surfaces 44 for the purpose of centering the disc pack on the spindle.

The spindle shaft itself is held in the spindle assembly 14 by a pair of bearings 46 and 47 rigidly held in a central opening 48A in the spindle housing 48. The opening extends vertically such that the spindle shaft passes through the opening in a manner to allow attachment of a drive pulley 49 which is power driven by a belt 50 for rotation of the spindle and the supported disc pack. The pulley is fixed to the spindle shaft by means of the pin assembly 53. Thus, by driving the spindle with the drive belt, the disc pack is revolved for moving the discs past the read/write heads for reading and writing data on the disc surfaces.

In accordance with the present invention, the spindle is formed of an assembly of a plurality of parts in a manner to provide an economical yet improved structure for supporting and centering the disc pack. Accordingly, the spindle comprises a main or central drive shaft 51 which is cylindrically shaped and hollow, with the top end bored to present an opening 52 and the bottom end bored to a diameter 54. Fixed around the top end of the shaft is a centering hub 55 which preferably is welded or otherwise attached to the top outer surface of the shaft. Just below and abutting the centering hub is mounted a support flange or plate 56 which extends radially outward from the drive shaft to support the disc pack. Within the opening 52 is fixed a sleeve 57 with a square hole extending therethrough to prevent the upper locking shaft of the disc pack (not shown) which fits down into the spindle from turning when the pack is locked into the spindle.

The centering hub 55 has the top outer surface machined to form a bevel 58 with the remaining outer surface providing an outer facing cylindrical surface 59. Thus, the insert 41 of the disc pack will first contact the bevelling surface which serves to center the pack over the spindle and then slip downward over the hub for centering the pack thereon.

The spindle flange 56 includes a raised outer facing ring 60 thereon which is machined to present a horizontal surface 61 for cooperating with the insert surfaces 38 to support the weight of the disc pack. Similarly, the top outer edge of the ring 60 is bevelled at 61 such that the centering ring will contact the bevelled surface and serve as a centering guide as the disc pack is placed on the spindle.

Thus in the manner shown, there is provided a spindle which is assembled from a plurality of parts of which each may be formed in a rather simplified manner to lower the cost of machining. By this construction, it is necessary only to harden the centering hub 55 and the support plate 56 since these parts present the precisely machined surfaces on which the disc pack is centered and supported. Further, because the individual parts are much smaller than the overall spindle shaft assembly, hardening and machining can be accomplished in much smaller apparatus thereby further reducing the costs of manufacture of the spindle.

That which is claimed is:

1. A method for manufacturing a spindle assembly for use in a disc drive apparatus having a baseplate and utilizing a disc pack having centering surfaces formed by inwardly facing insert members in a central opening in the bottom thereof and having horizontal support surfaces spaced radially outward from the central opening, said method comprising the steps of:

forming an elongated central drive shaft having first and second ends with the first end being adapted for attachment to a drive means;

fixing a hardened centering hub to the second end of the drive shaft; and fixing a hardened support plate to the drive shaft at a position intermediate the centering hub and drive means whereby the hardened centering hub and support plate will contact and support the disc pack.

2. The method for manufacturing a spindle assembly as described in claim 1 wherein said centering hub and support plate include beveled surfaces for centering the disc pack relative to the spindle assembly.

3. The method for manufacturing a spindle assembly as described in claim 2 wherein said central drive shaft is hollow and in combination with a sleeve fixed within the hollow drive shaft to interfit with the disc pack and prevent relative rotation between the disc pack and the spindle assembly.

* * * * *